United States Patent [19]

Rohr

[11] 4,436,133

[45] Mar. 13, 1984

[54] CAST VEHICLE WHEEL RIM

[75] Inventor: Jakob Rohr, Schaffhausen, Switzerland

[73] Assignee: George Fischer Ltd., Switzerland

[21] Appl. No.: 318,943

[22] Filed: Nov. 6, 1981

[30] Foreign Application Priority Data

Nov. 13, 1980 [CH] Switzerland ............... 8421/80

[51] Int. Cl.³ ............................................. B60B 21/02
[52] U.S. Cl. .................................. 152/381.3; 301/65;
    301/97; 29/159.1; 164/DIG. 14; 249/56
[58] Field of Search ................ 301/5 VH, 5 B, 6 CS,
    301/11 R, 12 R, 13 R, 135 M, 63 R, 63 PW, 63
    D, 65, 95–98; 29/159.1, 159.01; 164/DIG. 14;
    249/56; 152/427–428, 378 R, 381.3–381.6

[56] References Cited

U.S. PATENT DOCUMENTS

| 335,590 | 2/1886 | Jeffery | 301/97 X |
| 3,964,144 | 6/1976 | Kopp | 29/159.1 |
| 4,165,131 | 8/1979 | Thompson | 301/65 |

FOREIGN PATENT DOCUMENTS

| 2203421 | 8/1972 | Fed. Rep. of Germany | 29/159.01 |
| 2332223 | 1/1974 | Fed. Rep. of Germany | 301/65 |

*Primary Examiner*—Charles A. Marmor
*Attorney, Agent, or Firm*—Roylance, Abrams, Berdo & Goodman

[57] ABSTRACT

A vehicle wheel rim has a tire-engaging rim portion with two conical portions, one of which lies radially outwardly of a support ring having a conical surface for mounting the rim on a spider or the like. The outer ends of the conical portions terminate at tips and a drop center lies between the conical portions. A radial crosspiece extends from the support ring to about the center of the conical portion outside the support ring. The rim is cast in a mold having two mold halves and an annular core member defining the outer rim surface.

11 Claims, 3 Drawing Figures

CAST VEHICLE WHEEL RIM

This invention relates to a cast vehicle wheel rim, particularly for use with tubeless tires, of the type having a rim profile portion and a support ring which is mountable on a support device such as a spider, and a method of making such a wheel.

BACKGROUND OF THE INVENTION

A vehicle wheel having a welded rim with a rim profile and a support ring is known. A rim of this type is generally bent into the shape of a rim profile and the connection points are welded so that it forms only the bed of the rim, and the support ring is welded on. The support ring has a conical surface at an angle of about 28° for mounting on a support member such as a wheel spider. High spreading forces occur when the conical surface is pressed onto a wheel spider, and these forces tend to deform the support ring and can even form fractures or tears therein.

Today, it is generally the trend in the manufacture of vehicle parts to form such components by casting, both the wheels and the rims being cast because of lower cost and greater simplicity.

A problem arises with the casting of such a rim, which problem can only be resolved with additional costs in the casting process. The space between the support ring and the conical surface of the rim profile closest to the support ring is too long or deep and too narrow to be continuously manufactured out of mold sand in the normal compaction process using sand molds. This space must therefore be filled with a separate casting core which raises the production cost.

BRIEF DESCRIPTION OF THE INVENTION

An object of the present invention is to avoid both of the above mentioned disadvantages and to provide a rim having greater and more effective strength to withstand the spreading forces which affect the support cone and to provide a rim which makes possible the manufacture by casting with only one single annular core for the outside contour of the rim bed.

Briefly described, the invention includes a cast vehicle wheel rim, particularly for use with tubeless tire, of the type having a rim profile portion and a support ring formed with a conical surface for mounting on a support device such as a spider, and wherein the rim profile includes means defining a radially outwardly facing surface with first and second conical portions terminating at first and second outer tips, a shoulder and a drop center, the support ring being axially offset adjacent the first one of the conical portions, wherein the improvement comprises a generally radially extending annular crosspiece interconnecting the support ring with the center of said first conical portion and the remainder of said rim.

In another aspect, the invention includes a process for manufacturing a vehicle wheel rim of the type having a profile portion and a support ring formed with a conical surface for mounting on a support device such as a spider, and wherein the rim profile includes means defining a radically outwardly facing surface with first and second conical portions terminating at first and second outer tips, a shoulder and a drop center, the support ring being axially offset adjacent the first one of the conical portions, and a generally radially extending annular crosspiece interconnecting the support ring and the center of said first conical portion and the remainder of said rim, comprising the steps of providing a casting mold having first and second axially facing mold halves and an annular core shaped to define the radially outwardly facing surface of the rim, and casting the wheel rim in one piece in said casting mold.

In order that the manner in which the foregoing and other objects are attained in accordance with the invention can be understood in detail, particularly advantageous embodiments thereof will be described with reference to the accompanying drawings, which form a part of this specification, and wherein.

Figure 1:
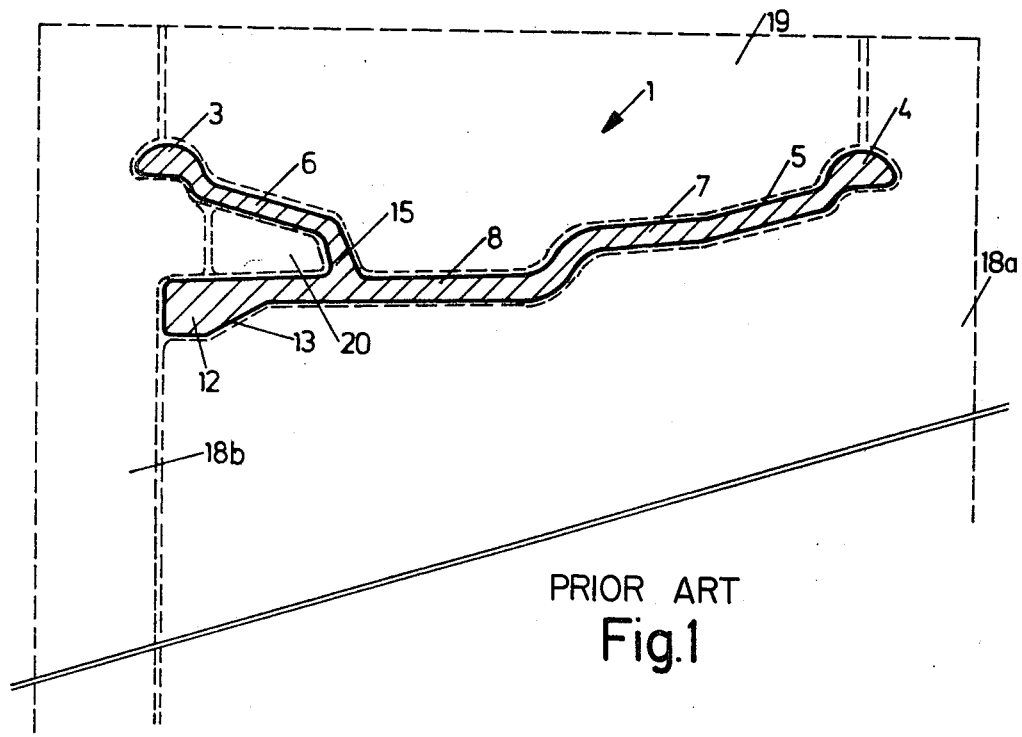
FIG. 1 is a partial sectional view of a prior art wheel rim profile, schematically illustrating the sand mold structure which must be used to cast such a rim.

The vehicle wheel illustrated in partial section in FIG. 1, as known from the state of present technology, comprises a rim 1 including a support ring 12 having a conical surface for engagement on a support member such as a wheel spide. Support ring 12 is tip-stretched or integrally shaped on the drop center portion 8 of rim 1. The rim profile itself, that portion which is radially outermost and will engage the tire, has a tip 3 on the side closest to the support ring, to the left in the drawing, and has a conical surface 6, which is normally a 15° cone, generally outwardly of the support ring, and inclined portion 15, a drop center 8, a shoulder 7, a free 15° conical surface 5 and a free tip 4. A rim of this type at the present time is normally welded such that the preformed rim profile is shaped into its curved form and welded at the connection and then is also welded to the support ring.

Another method of manufacture of a rim of this type is by casting, in which process the casting mold consists of an annular core 19 extending from about the middle of the left tip to the middle of the right tip, and the mold includes a top sand mold half 18a and a bottom sand mold half 18b. Since the sand molds must be manufactured in accordance with known mold compacting processes, the wedge-shaped space between support ring 12 and conical portion 6 cannot be filled by means of the sand mold since the compacting force does not suffice in that sort of narrow and pointed shape in order to attain sufficient compaction in a shape of that depth. Therefore, a separate annular core 20 must be inserted therein, the strength of which is guaranteed by one of the known core manufacturing processes. While this can be done, it creates additional costs and is therefore undesirable.

Also, it is to be recognized that a radial spreading force, which acts on support cone 13, presses support ring 12 outwardly (upwardly in the Figure) and thus weakens the seat of the rim on the wheel spider or even leads to the formation of tears.

Figure 2:
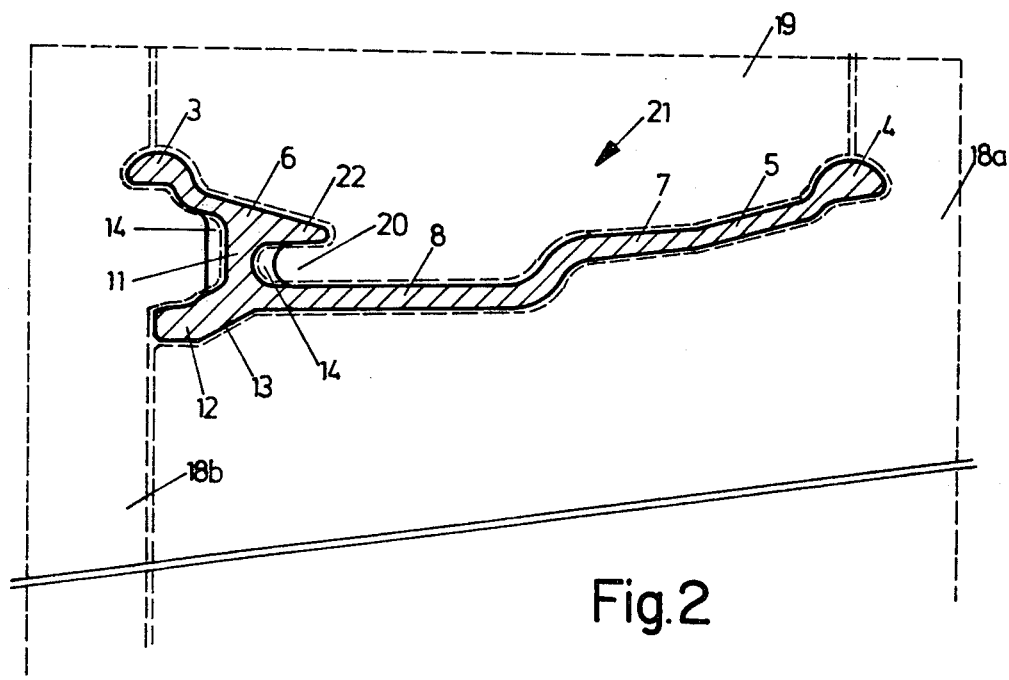
FIG. 2 is a partial side elevation, in section, of the profile of a wheel rim in accordance with the invention showing schematically the formation of a mold for casting the rim, the view of FIG. 2 being along line 10—10 of FIG. 3.
Figure 3:
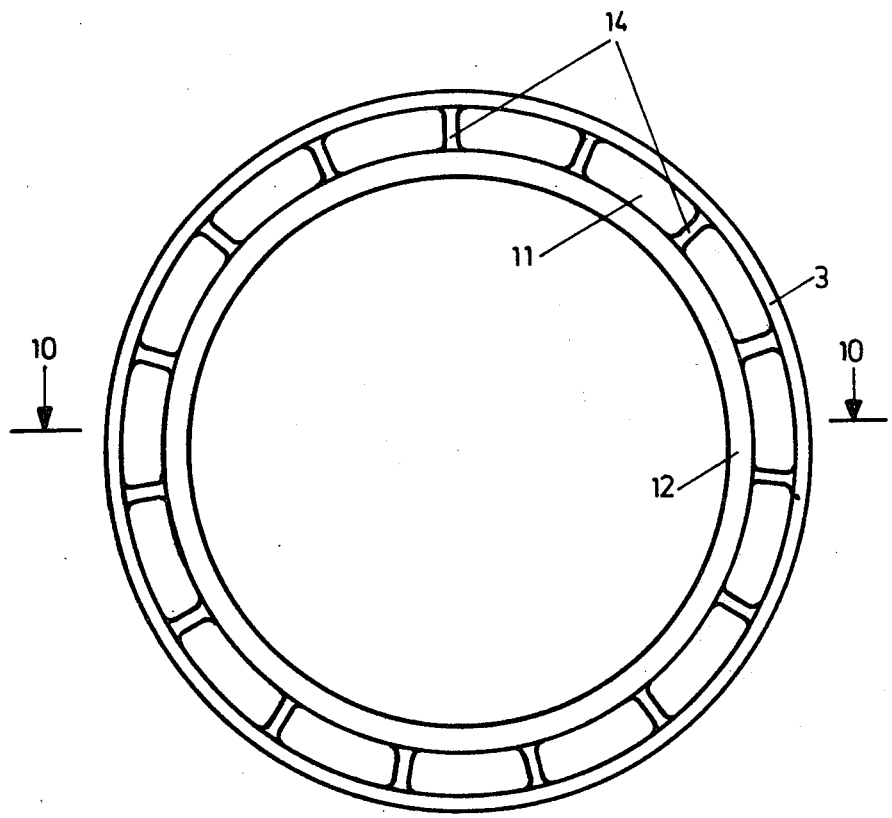
FIG. 3 is a front elevation of a vehicle wheel in accordance with the invention.

Both of these disadvantages are eliminated with a rim 21 in accordance with the invention as illustrated in FIGS. 2 and 3 wherein the same parts have the same numbers as in FIG. 1.

As seen in FIG. 2, the cone 6 does not extend, as was the case in FIG. 1, into an inclined element 15 which leads to drop center 8, but instead is supported approximately in its middle area by a crosspiece 11 which connects the conical portion 6 with support ring 12 and forms the connection to drop center 8 which extends further to the left so that the right-hand limit of the conical portion 6 forms a lobe 22 under which there is a pocket 20. As will be recognized, the pocket arrangement extends around the entire rim. Weights can be placed in this pocket for balancing the wheel. Radial inside and outside ribs 14 and 14', respectively, are uniformly distributed around crosspiece 11 and extend over the entire periphery of rim 21. The shape of the rim is such that the center of the mounting surface of a tire bead on cone 6, the crosspiece 11, and the support cone 13 are essentially in the same plane perpendicular to the axis of the entire wheel so that the spreading forces which act on support cone 13 are optimally absorbed.

The manner in which the rim of FIGS. 2 and 3 can be manufactured by casting techniques is shown by the dashed lines which illustrate the placement and location of sand mold halves 18a and 18b and annular core 19, pocket 20 being filled by the annular core. As will be seen, the space between tip 3 and support ring 12 is of a somewhat different shape from the prior art arrangements, being shallower and wider so that it can be produced with mold sand without problems.

As shown in FIG. 3, which is an axially view of the wheel, the outside ribs 14 are arranged between tip 3 and support ring 12 and extend around the periphery of the wheel.

While certain advantageous embodiments have been chosen to illustrate the invention it will be understood by those skilled in the art that various changes and modifications can be made therein without departing from the scope of the invention as defined in the appended claims.

What is claimed is:

1. A unitary, cast vehicle wheel rim, particularly for use with a tubeless tire, comprising:
    a rim profile portion formed with a radially outwardly facing surface having a first outer tip, a first conical portion, a drop center, a shoulder, a second conical portion and a second outer tip in sequence axially, said first conical portion partially overlying and spaced radially relative to said drop center;
    a support ring axially offset adjacent said first conical portion and formed as an axial extension of said drop center, said support ring having a conical surface for mounting the rim on a support device, such as a spider; and
    a generally radially extending annular crosspiece interconnecting said support ring with the center of said first conical portion, and thereby, with the remainder of the rim.

2. A wheel rim according to claim 1 and including: means defining at least one pocket between said first conical portion and said drop center, said pocket being adapted to receive weights.

3. An apparatus according to claim 1 or 2 and including a plurality of axially protruding radially extending reinforcement ribs circularly distributed around at least the side of said crosspiece facing away from said drop center.

4. A wheel rim according to claim 3 wherein the rim is adapted to receive each bead of a mounted tire on a mounting location on one of said conical portions and its associated tip, and wherein said mounting location on said first conical portion lies in substantially the same plane with said conical surface on said support ring and said crosspiece.

5. A wheel rim according to claim 1 wherein the rim is adapted to receive each bead of a mounted tire on a mounting location on one of said conical portions and its associated tip, and wherein said mounting location on said first conical portion lies in substantially the same plane with said conical surface of said support ring and said crosspiece.

6. A wheel rim according to claim 1 wherein the wheel rim is cast from a ductile material.

7. A wheel rim according to claim 6 wherein said ductile material is nodular graphite iron.

8. A wheel rim according to claim 6 wherein said ductile material is aluminum alloy.

9. A process for manufacturing a unitary vehicle wheel rim of the type having a rim profile portion and a support ring formed with a conical surface for mounting the rim on a support device such as a spider, wherein the rim profile includes means defining a radially outwardly facing surface with first and second conical portions terminating at first and second outer tips, a shoulder and a drop center, the support ring being an axial extension of the drop center and being axially offset adjacent the first conical portion, and a generally radially extending annular crosspiece interconnecting the support ring with the center of the first conical portion and thereby with the remainder of the rim, comprising the steps of:
    providing a casting mold having first and second axially facing mold halves of compacted sand and only a single annular casting core shaped to define the radially outwardly facing surface of the rim, and
    casting the wheel rim in one piece in said casting mold.

10. A process according to claim 9 wherein the mold is formed so that the wheel rim is initially cast oversize in the radial direction and shrinks upon cooling.

11. A process according to claim 9 or 10 wherein the wheel rim is formed so that the crosspiece forms pockets to receive weights.

* * * * *